REESE & TYLER.
Gas-Lamp Lighter.

No. 17,637.  Patented June 23, 1857.

UNITED STATES PATENT OFFICE.

JOHN REESE AND CHAS. N. TYLER, OF WASHINGTON, DISTRICT OF COLUMBIA.

LANTERN FOR LIGHTING STREET-GAS.

Specification of Letters Patent No. 17,637, dated June 23, 1857.

*To all whom it may concern:*

Be it known that we, JOHN REESE and CHAS. N. TYLER, both of the city of Washington, in the District of Columbia, have invented a new and useful Improvement in Hand-Lamps for the Purpose of Lighting Street Gas-Lamps; and we do hereby declare that the following is a full, clear, and exact description thereof, reference being had to the accompanying drawing, through letters of reference marked thereon, forming part of this specification, in which—

Figure 1:
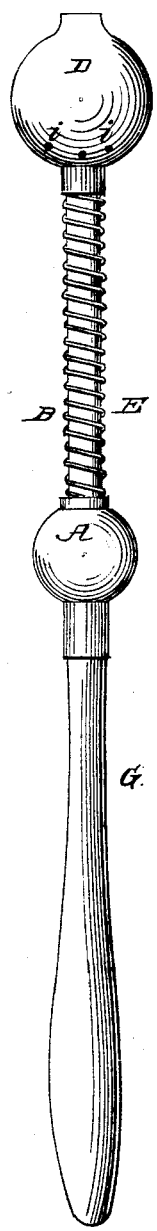
Figure 2:
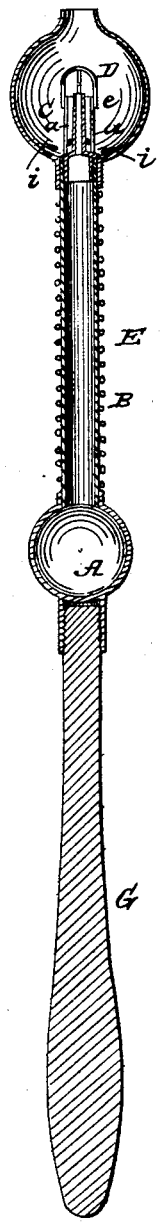

Figure 1, represents an elevation of our lamp, and Fig. 2, a section taken longitudinally through its center.

The same letters of reference occurring in both figures indicate like parts.

The nature of our invention consists in constructing a lamp (for burning alcohol, ethereal oil, or other suitable fluid, or prepared wick,) with a sliding shade to inclose the burner and prevent the light from being blown out, in such manner, that when forced up against an inverted funnel shaped aperture in the bottom of an ordinary street lamp, the burner will pass up through such aperture into the lamp to ignite the gas; and when withdrawn, the shade is again forced over it to protect it from the weather so that it may be carried through the streets from lamp to lamp for the purpose of lighting up, and thus save the trouble and delay consequent upon having to light a match and climb the post at every lamp.

To enable others to make and use our invention we will now describe its construction and operation.

A represents the reservoir for the fluid to be burned, to which is attached a tube (B) of suitable size for the wick to pass freely through, and of sufficient length to pass up through an aperture provided for the purpose in the bottom of the lamp, high enough to ignite the gas when turned on; this tube is surmounted by a burner (C) similar to those used for burning ethereal oil; a globular or other suitable formed shade (D) is fitted to slide freely over the tube (B) and is borne up to inclose the burner, by a wire spring (E) around the tube. This shade (D) is perforated around near the bottom, with a number of holes (*i*) for the admission of air to supply the burner when incased by it, and around the burner is a cylindrical, conical or wire guard (*e*), of sufficient height and diameter to protect the wick from coming in contact with the funnel shaped aperture designed for its entrance in the bottom of the lamp or with the valve that covers it, either in entering or withdrawing it, by which the light might be extinguished; and which guard if made of sheet metal should have air holes (*a*) near the bottom to supply air to the burner—this lamp is then mounted on a stem or handle (G) of sufficient length for the burner to be inserted into the lamp to ignite the gas by a person standing on the ground.

The lamp post being so constructed as that the gas may be turned on from the ground and the lamp provided with a funnel shaped aperture in its bottom which is covered by a sliding or door valve, (all of which is made the subject of another patent and therefore needs no special description here,) the lamplighter having trimmed and lighted this spirit lamp proceeds to light up as follows: On arriving at a lamp-post, he turns on the gas with a key carried for the purpose, and then enters the mouth of the shade (D) into the funnel in the bottom of the lamp and presses the burner up, the spring (E) yielding allows the tube (B) to slide through the shade (D) when the guard (*e*) comes in contact with the valve or door, which covers the aperture in the bottom of the lamp, and opens it, to allow the burner to pass up far enough to ignite the gas; and when it is withdrawn the shade (D) is held by the spring against the funnel until the burner has again entered it and the valve closed so that there is no possibility of the light being blown out.

Having thus described our invention what we claim as new and desire to secure by Letters Patent is—

The gas lighter above described, consisting of the sliding shade (D), spring (E) and guard (*e*) arranged and operating in the manner and for the purposes set forth.

In testimony whereof we have hereunto set our hands this 1st day of May A. D. 1857, before two subscribing witnesses.

JOHN REESE.
CHAS. N. TYLER.

Witnesses:
THOMAS C. DONN,
CHARLES KEMBET.